United States Patent
Iwamoto et al.

[11] Patent Number: 6,133,649
[45] Date of Patent: Oct. 17, 2000

[54] VEHICLE ANTI-THEFT SYSTEM AND METHOD USING SWITCHING DEVICE PROVIDED IN THE VEHICLE

[75] Inventors: Koji Iwamoto, Higashikamo-gun; Motoshi Kondo, Seto; Masachika Kamiya, Toyota; Takao Akatsuka, Aichi-gun, all of Japan

[73] Assignee: Toyota Jidosha Kabushiki Kaisha, Toyota, Japan

[21] Appl. No.: 08/930,363

[22] PCT Filed: Mar. 28, 1996

[86] PCT No.: PCT/JP96/00824

§ 371 Date: Jan. 12, 1998

§ 102(e) Date: Jan. 12, 1998

[87] PCT Pub. No.: WO96/30236

PCT Pub. Date: Oct. 3, 1996

[30] Foreign Application Priority Data

Mar. 28, 1995 [JP] Japan ................................ 7-069430

[51] Int. Cl.[7] .................................................. B60R 25/04
[52] U.S. Cl. .......................................... 307/10.5; 180/287
[58] Field of Search ................................... 307/10.1–10.6; 180/287; 340/825.31, 825.32, 825.3, 825.69, 825.72, 825.57, 425.5, 426, 825.44, 825.54

[56] References Cited

U.S. PATENT DOCUMENTS

| | | | |
|---|---|---|---|
| 4,749,873 | 6/1988 | Mutoh et al. | 307/10.2 |
| 4,990,906 | 2/1991 | Kell et al. | |
| 5,349,459 | 9/1994 | Reed | 340/825.57 |
| 5,508,694 | 4/1996 | Treharne et al. | 340/825.31 |
| 5,621,380 | 4/1997 | Mutoh et al. | 307/10.2 |
| 5,635,916 | 6/1997 | Bucholtz et al. | 307/10.3 |
| 5,670,933 | 9/1997 | Hayashi | 340/426 |

FOREIGN PATENT DOCUMENTS

| | | |
|---|---|---|
| WO95/05958 | 3/1995 | European Pat. Off. |
| 8501607 | 11/1997 | European Pat. Off. |
| 4333474 | 2/1995 | Germany |
| 55-23277 | 2/1980 | Japan |
| 62-88644 | 4/1987 | Japan |
| 62-248768 | 10/1987 | Japan |
| 63-24066 | 2/1988 | Japan |
| 1-103462 | 7/1989 | Japan |
| 1-237242 | 9/1989 | Japan |
| 2-53654 | 2/1990 | Japan |
| 2-164644 | 6/1990 | Japan |
| 4-22366 | 2/1992 | Japan |
| 4-38247 | 2/1992 | Japan |
| 6-298042 | 10/1994 | Japan |

*Primary Examiner*—Richard T. Elms
*Attorney, Agent, or Firm*—Kenyon & Kenyon

[57] ABSTRACT

A vehicle antitheft system and method which effect re-registration and erasure of codes without using a tool used exclusively for such purposes. By the time T1 seconds has elapsed from the time a master key, in which a code is registered, is inserted into a key cylinder, turning an ignition switch from off to on is repeated five times. When opening and closing of a door is repeated six times and the ignition switch is turned off and the key is removed from the key cylinder in the next T2 seconds, a mode is changed to a master key code registration mode. When a master key whose code is to be registered is inserted into the key cylinder within T3 seconds from the time when a master key in which a code is registered is removed from the key cylinder, and the ignition switch is turned on within T4 seconds, an identification code to be registered is read from a transponder. When T5 seconds has elapsed, the read identification code is registered in the memory as a registered code.

25 Claims, 15 Drawing Sheets

(REGISTRATION FOR TWO MASTER KEYS AND ONE AUXILIARY KEY)

VEHICLE ANTI-THEFT SYSTEM AND METHOD USING SWITCHING DEVICE PROVIDED IN THE VEHICLE

TECHNICAL FIELD

The present invention relates to a vehicle antitheft system and method, and in particular, to a vehicle antitheft system and method in which, if an identification code transmitted from a transponder and a registered code stored in a memory provided in the vehicle do not match, the engine cannot be started.

TECHNICAL BACKGROUND

In a conventional vehicle antitheft system, a bar code is provided in a key, and starting of the engine of the vehicle is permitted only when the bar code matches a registered code which has been stored in advance in the vehicle antitheft device (Japanese Patent Application Laid-Open No. 62-88644).

Registered codes are stored in advance in the vehicle antitheft system when the vehicle is shipped from the factory. In this vehicle antitheft system, in a case in which a key is lost or in a case in which a key is stolen or the like, it is necessary to make possible the starting of the engine of the vehicle by using a new key. In order to do so, by using a tool used exclusively for such a purpose and a pass code, the registered code which has already been registered must be erased, and an identification code corresponding to a new key must be registered. Further, in cases in which other keys are also to be used, identification codes corresponding to these new keys must be registered.

However, in the conventional vehicle antitheft system, the tool used exclusively for such a purpose is needed in order to register a new code, re-register a code, or erase a registered code. Therefore, it is either necessary to take the vehicle into the service dealer or bring the tool used exclusively for such a purpose to the location of the vehicle in order to effect erasure and registration. There is a problem in that the erasure of codes stored in advance and the re-registration of new identification codes require much trouble.

Further, there is a problem in that erasure of codes and re-registration of codes cannot be carried out if the pass number has been forgotten.

The present invention was made in order to solve the above-described problems, and an object of the present invention is to provide a vehicle antitheft system and method in which erasure of registered codes, re-registration, and the like can be carried out without using a tool used exclusively for such purposes.

DISCLOSURE OF THE INVENTION

In order to achieve the aforementioned object, a first aspect of the present invention is a vehicle antitheft system which is set so as to prevent starting of an engine when a predetermined operation is carried out, and for which setting is canceled so as to permit the starting of the engine when communication is carried out with a transponder provided in a key and transmitting an identification code and the identification code transmitted from the transponder matches a registered code which has been registered in advance, comprising: judging means for judging whether a specific key equipped with a transponder, which transmits an identification code corresponding to a registered code which has been registered in advance, is inserted in a key cylinder; mode changing means for changing a mode when a predetermined combination operation of on-and-off operations of a switching means provided in a vehicle is carried out after the specific key has been inserted in the key cylinder; and code changing means for effecting at least one of re-registration of a code and erasure of a registered code after the mode has been changed.

A second aspect of the present invention is a vehicle antitheft system which is set so as to prevent starting of an engine when a predetermined operation is carried out, and for which setting is canceled so as to permit the starting of the engine when communication is carried out with a transponder provided in a key and transmitting an identification code and the identification code transmitted from the transponder matches a registered code which has been registered in advance, comprising: canceling means for canceling the setting of the vehicle antitheft system so as to permit the starting of the engine when, in a state in which the vehicle antitheft system is set such that the starting of the engine is prohibited, the identification code is inputted by a predetermined combination of on-and-off operations of a switching means provided in a vehicle.

The vehicle antitheft system of the first aspect of the present invention is set to prohibit starting of the engine when a predetermined operation has been carried out, e.g., when the key has been removed from the key cylinder or when a predetermined period of time has passed since the ignition switch was turned off. Cancellation of this set state is effected as follows. Communication with a transponder provided in the key is carried out, and it is judged whether a registered code which was registered in advance and an identification code transmitted from the transponder match. When the registered code and the identification code transmitted from the transponder match, the set state is canceled such that starting of the engine is permitted.

A specific key which is equipped with a transponder which transmits an identification code corresponding to a registered code which was registered in advance, e.g., a master transponder key, is inserted into a key cylinder. Thereafter, when a predetermined combination operation of on-and-off operations of a switching means provided in the vehicle is carried out, the mode is changed. When the mode is changed, at least one of re-registration of a code and erasure of registered codes can be carried out.

The term "on-and-off operation" as used herein means the operation of turning a switch of the vehicle on-and-off. "Combination operation of on-and-off operations" means turning a plurality of switches on-and-off.

In accordance with the first aspect, a specific key in which a code has been registered in advance is used, and a code is re-registered or registered codes are erased by a combination operation of on-and-off operations of switches provided in the vehicle. Therefore, codes can be erased or re-registered or the like without using a tool used exclusively for such purposes.

In accordance with the second aspect of the present invention, in a state in which the vehicle antitheft system is set so as to prohibit starting of the engine, when an identification code is inputted by a predetermined combination operation of on-and-off operations of the switching means provided in the vehicle, the set state is canceled so that starting of the engine is permitted.

Accordingly, even in cases in which the identification code cannot be transmitted due to trouble with the transponder or the like, starting of the engine can be permitted by inputting an identification code by a combination operation of on-and-off operations of the switching means provided in the vehicle.

A third aspect of the present invention is a vehicle antitheft method which is set so as to prevent starting of an engine when a predetermined operation is carried out, and for which setting is canceled so as to permit the starting of the engine when communication is carried out with a transponder provided in a key and transmitting an identification code and the identification code transmitted from the transponder matches a registered code which has been registered in advance, comprising the steps of: judging whether a specific key equipped with a transponder, which transmits an identification code corresponding to a registered code which has been registered in advance, is inserted in a key cylinder; changing a mode when a predetermined combination operation of on-and-off operations of a switching means provided in a vehicle is carried out after the specific key has been inserted in the key cylinder; and effecting at least one of re-registration of a code and erasure of a registered code after the mode has been changed.

PREFERRED EMBODIMENT FOR IMPLEMENTING THE INVENTION

An embodiment of the vehicle antitheft system (immobilizer) to which the present invention is applied will be described in detail hereinafter with reference to the drawings.

Figure 1:
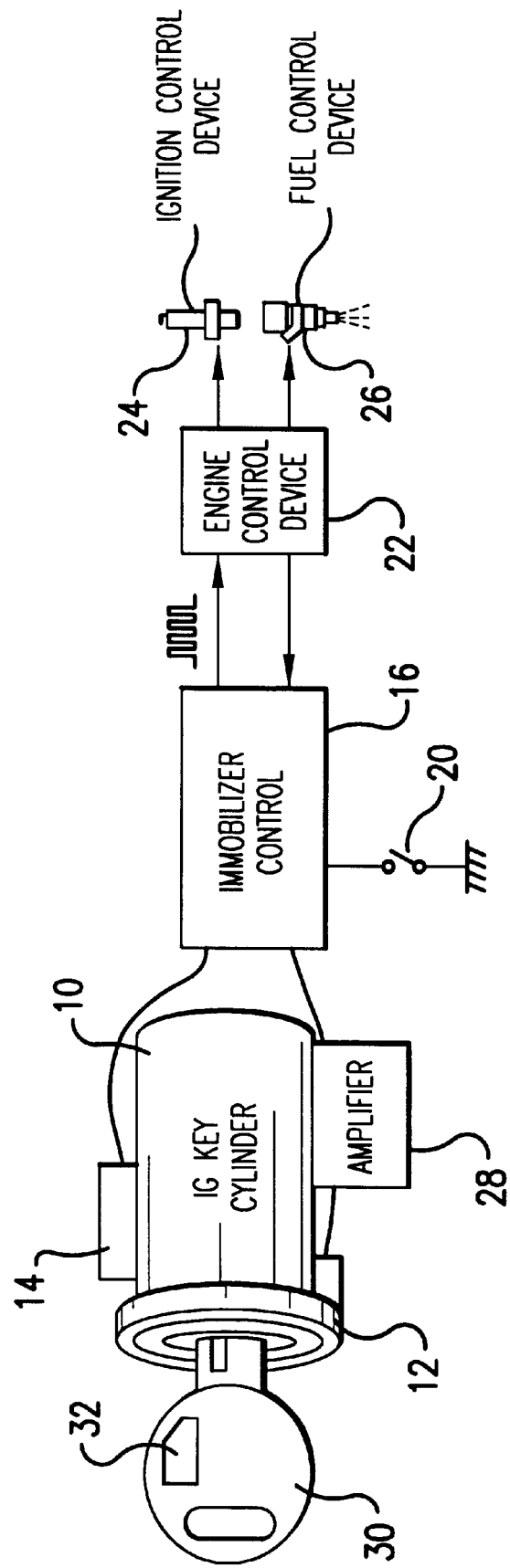
FIG. 1 is a schematic view of an immobilizer relating to an embodiment of the present invention.
Figure 3:
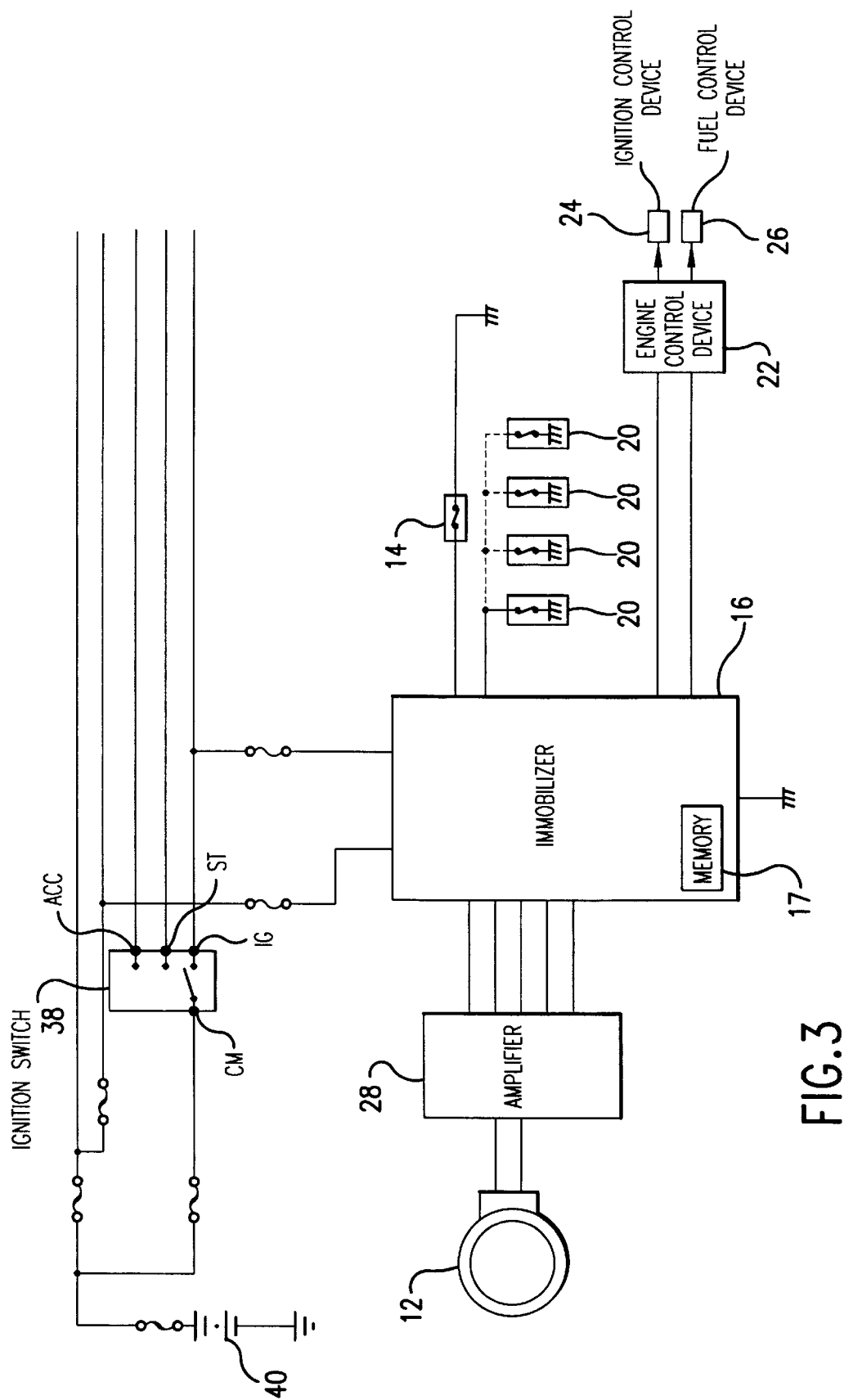
FIG. 3 is a wiring diagram illustrating the wired state of FIG. 1.

As illustrated in FIGS. 1 and 3, a key cylinder 10 which houses an ignition switch is provided in a vehicle. An antenna 12 which is formed by a coil is mounted to the key insertion side end portion of the key cylinder 10 so as to be concentric with the key cylinder 10. The antenna 12 is connected, via an amplifier 28 which amplifies signals received at the antenna 12, to an immobilizer control device 16 which is formed by a microcomputer formed so as to include a central processing unit (CPU), a RAM, and a ROM.

A key unlock warning switch (hereinafter, "warning switch") 14, which is turned on when a key 30 is inserted into the key cylinder 10 and which is turned off when the key 30 is removed from the key cylinder 10, is mounted to the key cylinder 10.

The warning switch 14 is connected to the immobilizer control device 16. Courtesy switches 20, which are turned on when doors are opened and are turned off when the doors are closed, are also connected to the immobilizer control device 16. Further, a memory 17 which stores registered codes is housed in the immobilizer control device 16.

The immobilizer control device 16 is connected to an engine control device 22 which is formed so as to include a microcomputer. An ignition device 24 and a fuel injection device 26 are connected to the engine control device 22. The ignition time of the engine and amount of injected fuel supplied to the engine are controlled by the engine control device 22.

Figure 2:
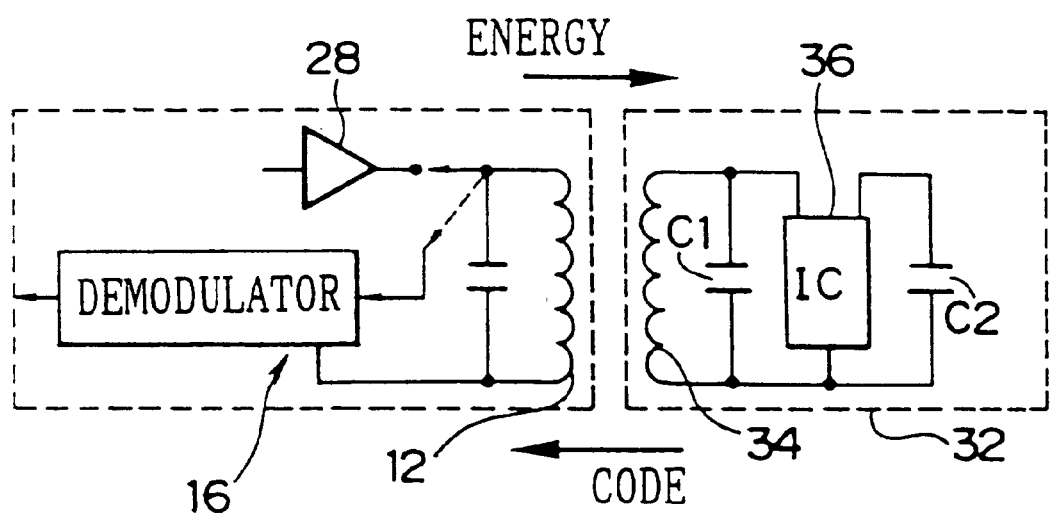
FIG. 2 is a circuit diagram illustrating details of a transponder.

A transponder 32 is embedded within the key 30. As illustrated in FIG. 2, the transponder 32 is formed by a transmitting/receiving antenna 34, a capacitor C1, an IC chip 36, and a capacitor C2. The transmitting/receiving antenna 34 is formed by a coil. The capacitor C1, together with the antenna 34, forms an oscillating circuit. The IC chip 36 stores an identification code (ID code) for the key 30, and when electric power is supplied, the IC chip 36 transmits this identification code from the antenna 34. The capacitor C2 stores electromagnetic wave energy.

In accordance with the transponder 32, when electromagnetic wave energy transmitted from the antenna 12 is received at the antenna 34, the received electromagnetic wave energy is stored in the capacitor C2. The IC chip 36 is activated by this stored energy, and transmits the identification code to the antenna 12 via the antenna 34.

Two types of keys 30, a plurality of master keys (master transponder keys) and a plurality of auxiliary keys (auxiliary transponder keys), are provided. An identification code is stored in the transponder embedded in each key.

As illustrated in FIG. 3, an ignition switch 38 includes an accessory terminal ACC, an ignition terminal IG, a start terminal ST, and a common terminal. The common terminal CM is connected to the positive electrode of a vehicle battery 40 via a fusible link. The positive electrode of the vehicle battery 40 is connected to the immobilizer control device 16 via a fusible link and a fuse. As a result, electric power is always supplied to the immobilizer control device 16 from the vehicle battery 40.

The ignition terminal IG is connected to the immobilizer control device 16 via a fuse. Accordingly, when the common terminal CM is switched to the ignition terminal IG position, i.e., when the ignition switch is on, an on signal is inputted to the immobilizer control device 16. In FIG. 3, four courtesy switches 20 are provided so as to correspond to the number of doors of a four-door vehicle. However, in the present embodiment, only the courtesy switch 20 corresponding to the door at the driver's side is used.

First, with reference to FIG. 15, description will be given of a case in which codes of a master key and an auxiliary key are newly registered in the memory at the time of shipping from the factory. Registration of a code of a master key is carried out with the door open (with the courtesy switch 20 on). When the key is inserted into the key cylinder (i.e., when the warning switch 14 is turned on) and the ignition switch is turned on, i.e., when the ignition terminal IG and the common terminal CM connect, electromagnetic wave energy is supplied from the antenna 12, and the identification code stored in the IC chip of the transponder is read and is temporarily stored in the memory 17 of the immobilizer control device 16. When there are other keys whose codes are to be registered, the key inserted in the key cylinder is removed, the key whose code is to be registered is inserted into the key cylinder, and in the same way as described above, the ignition switch is turned on, and the identification code is read and is temporarily stored in the memory 17. When the key is removed and the open door is closed, the codes are newly registered in the memory 17.

Registration of a code of an auxiliary key is carried out with the door closed (i.e., with the courtesy switch off). When the key is inserted into the key cylinder and the ignition switch is turned on, the identification code stored in the IC chip of the transponder is read as described above, and the read code is newly registered in the memory 17.

Figure 15:
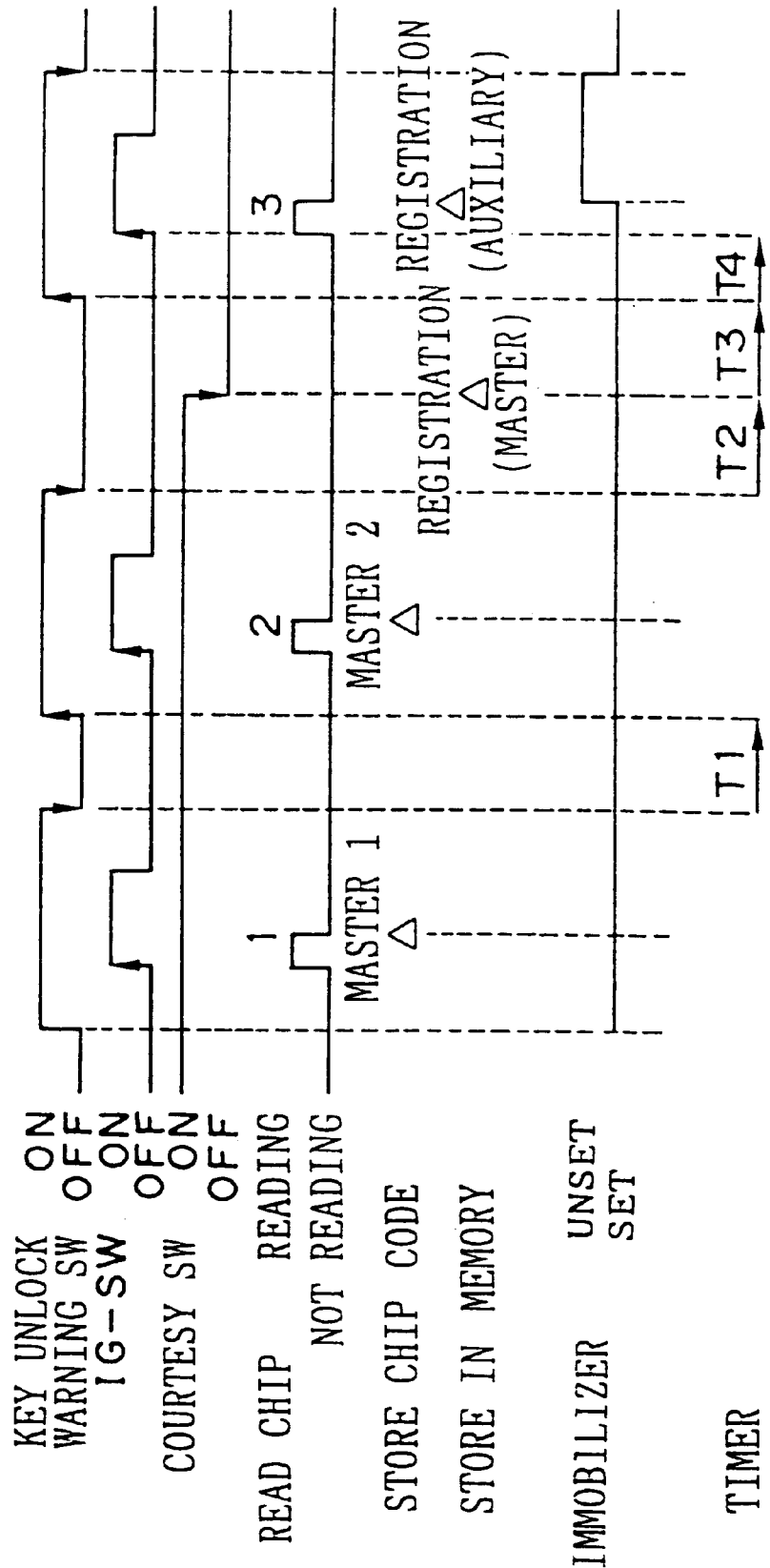
FIG. 15 is a line diagram illustrating a time chart in a case in which key codes are newly registered.

FIG. 15 is a time chart for a case in which the identification code of one auxiliary key is newly registered after codes of two master keys have been newly registered.

Next, a setting/unsetting and registered code adding/erasing routine by the immobilizer control device 16 will be described with reference to FIG. 4.

Figure 4:
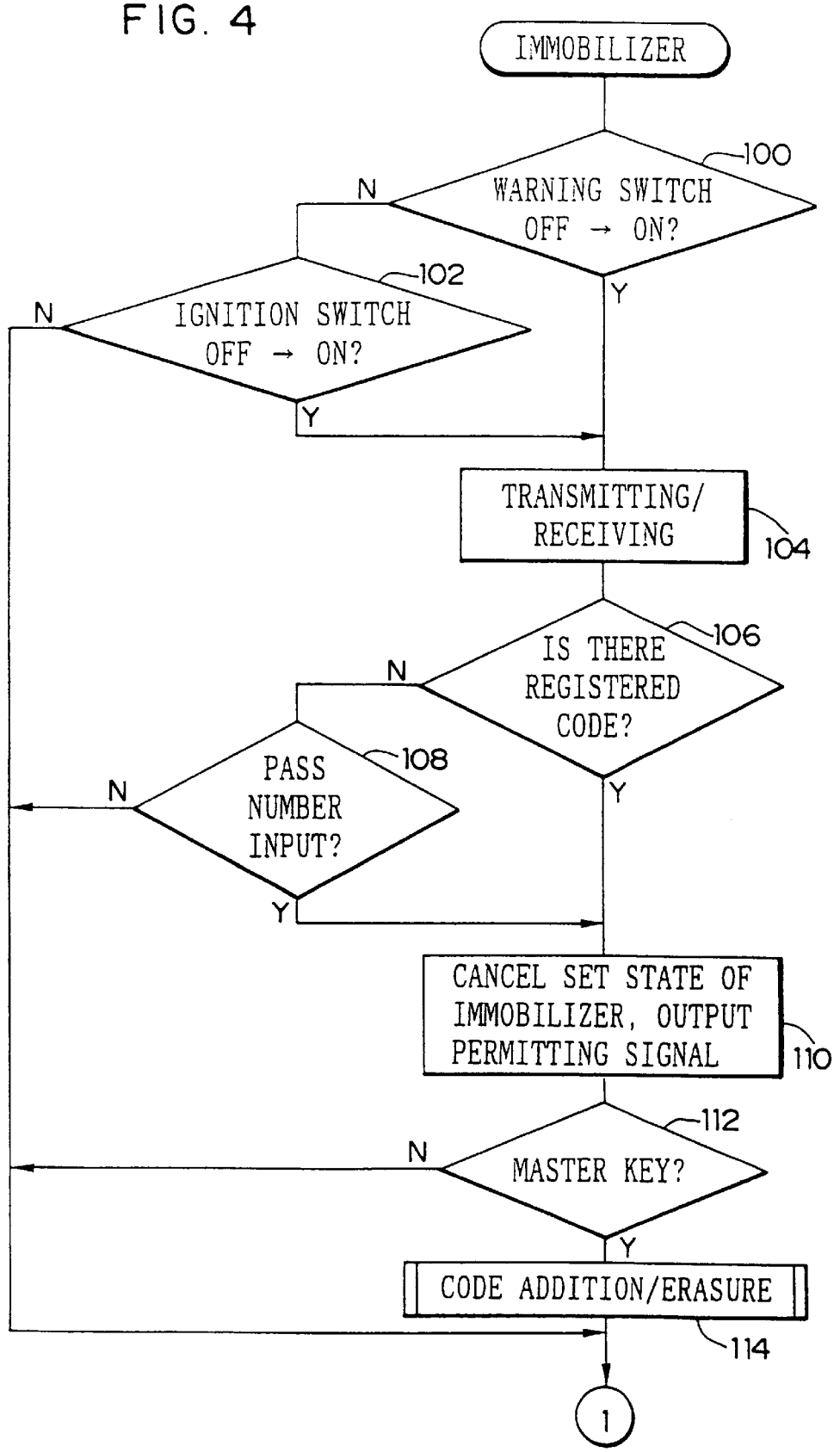
FIG. 4 is a flowchart illustrating a portion of a processing routine of an immobilizer control device.

The routine in FIG. 4 is executed every time a predetermined period of time passes. In step 100, by judging whether the warning switch 14 has changed from off to on, a judgment is made as to whether the key 30 has been inserted in the key cylinder 10. When the warning switch 14 is turned on, electromagnetic wave energy is supplied from the antenna 12 in step 104. In this way, the identification code is transmitted from the transponder 32, is received by the antenna 12, and is read.

On the other hand, in a case in which the warning switch 14 is not turned on even if the key 30 is inserted in the key cylinder 10, in step 102, a judgment is made as to whether the ignition switch has changed from off to on, i.e., whether the ignition switch has been turned on. When the warning switch is not on and the ignition switch is on, i.e., when, with the warning switch off, there is some trouble with the warning switch and the key 30 is inserted into the key cylinder 10 and the ignition switch is turned on, transmitting of electromagnetic wave energy from the antenna and receipt of the identification code by the antenna are carried out in step 104 in the same manner as described above.

In this way, even in cases in which there is trouble with the warning switch and the warning switch is off, the identification code can be received, the immobilizer can be unset (the set state can be canceled), and the engine can be started.

In step 102, when the ignition switch does not change from off to on, i.e., when no key has been inserted in the key cylinder, or when, with the warning switch off, there is trouble with the warning switch and a key has been inserted in the key cylinder but the ignition switch is not on, the routine ends.

In subsequent step 106, the received identification code and the registered codes stored in the memory are compared, and a judgment is made as to whether a registered code which is the same as the received identification code has been registered. When this judgment is affirmative, a legitimate key has been inserted into the key cylinder. Therefore, in step 110, the set state of the immobilizer is canceled (unset), and the engine can then be started by turning the key 30 to the start position.

When it is judged in step 106 that no registered code which is the same as the identification code has been registered, in step 108, a judgment is made as to whether the pass number has been inputted. If the pass number has not been inputted, this is not a legitimate driver, and therefore the routine ends and unsetting of the immobilizer is not carried out.

When there is trouble or the like with the transponder, the particular identification code of the key is not inputted to the immobilizer control device 16. Therefore, the driver enters the pass number by combinations of on-and-off operations of the ignition switch and on-and-off operations of the courtesy switch. The on-and-off operation of the courtesy switch is carried out by opening and closing the door.

Figure 8:
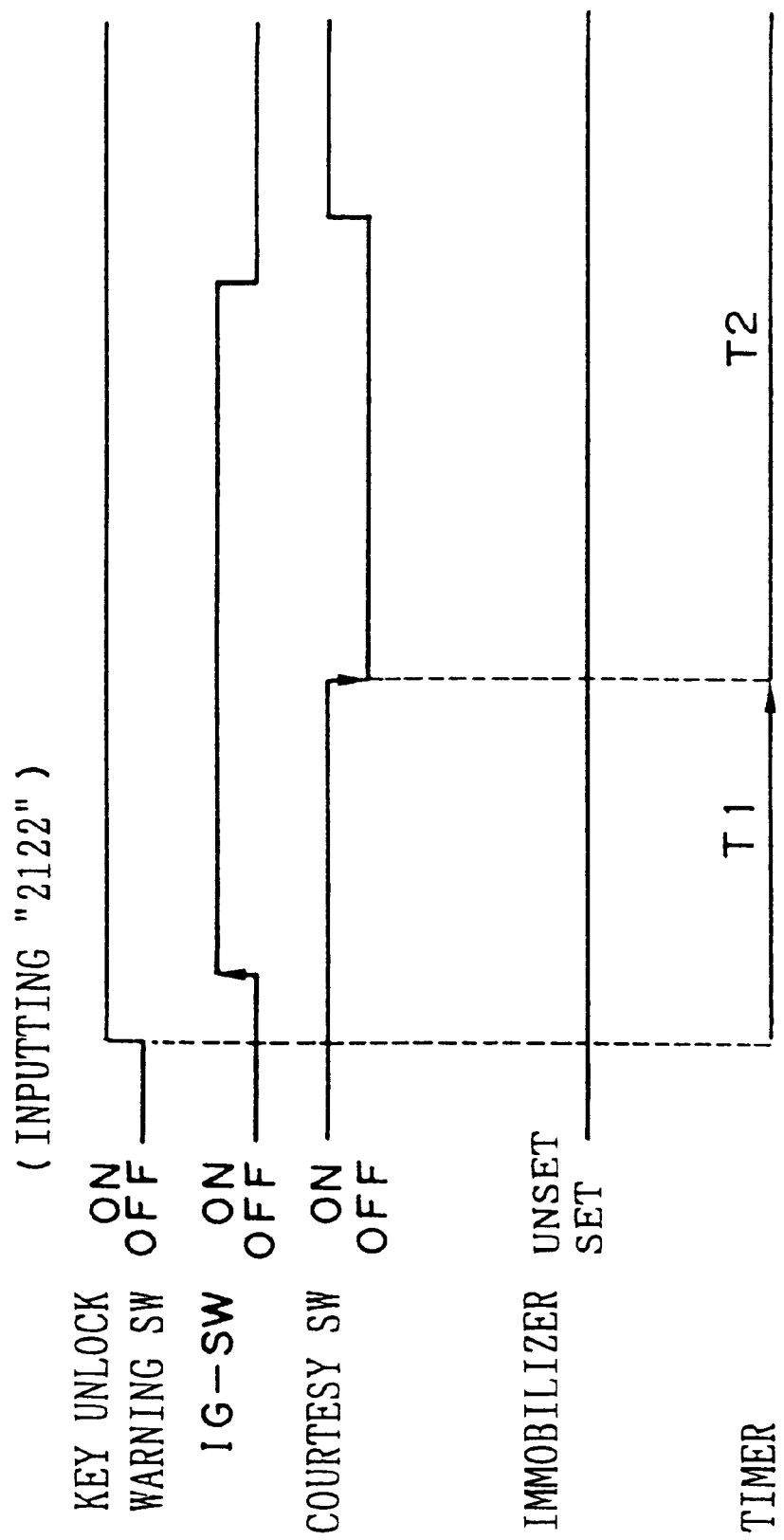
FIG. 8 is a line diagram illustrating the first half of a time chart for inputting a pass number.
Figure 9:
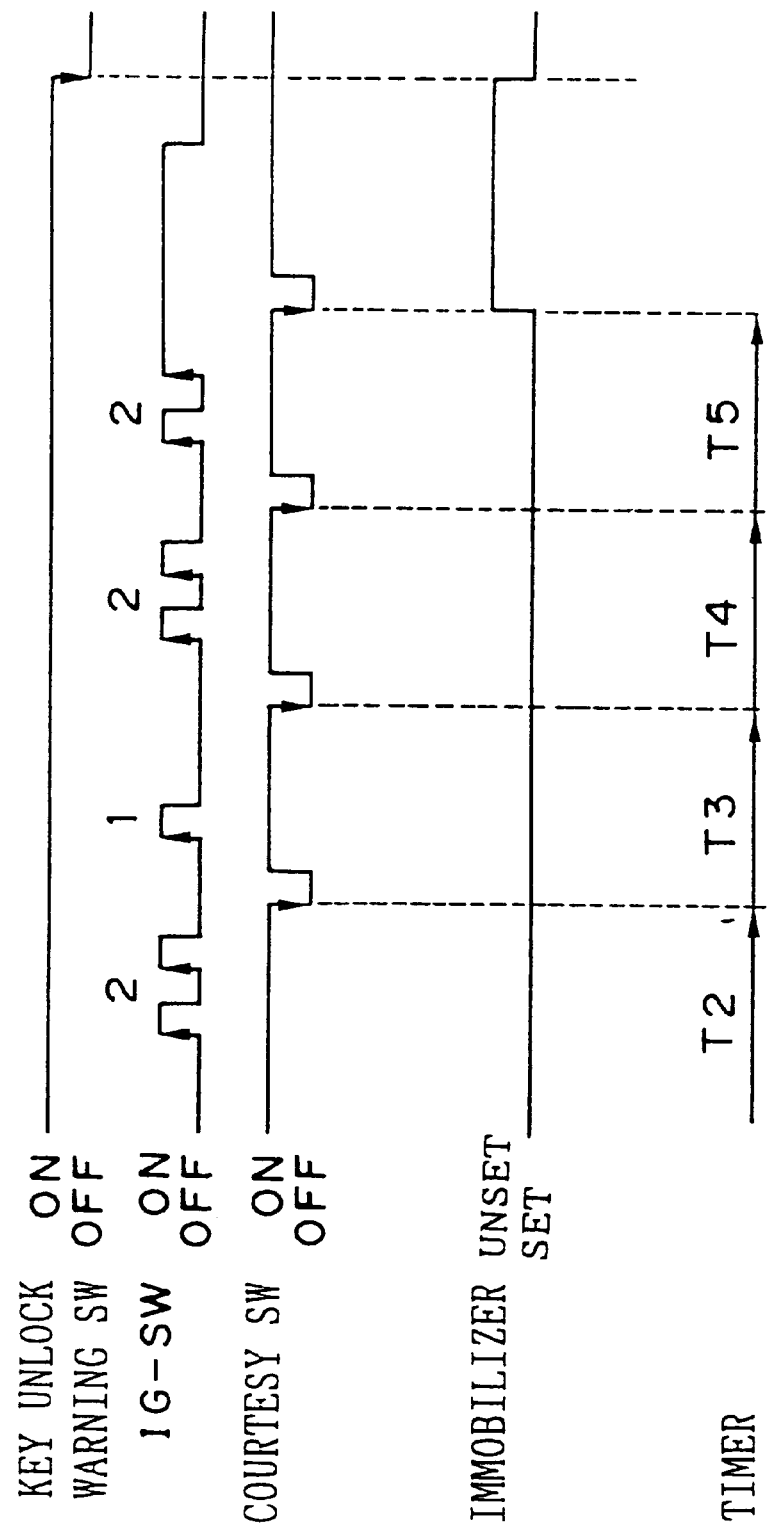
FIG. 9 is a line diagram illustrating the second half of the time chart for inputting a pass number.

In the present embodiment, the numeral of each digit of the pass number is inputted by repeating the on-and-off operation of the ignition switch that number of times, and spacing between the digits is carried out by opening and closing the door. A case in which "2122" is inputted as the pass number will be described in detail with reference to FIGS. 8 and 9.

Even if the key is inserted in the key cylinder (i.e., the warning switch is on) and the ignition switch is on, the immobilizer is not unset because the identification code is not transmitted. As a result, by the time T2 seconds (e.g., 20 seconds) has passed from the time the driver gets in the vehicle and first closes the door, the ignition switch is returned to off, and with the door once opened (the courtesy switch on), on-and-off operation of the ignition switch is repeated twice, and thereafter the door is closed (the courtesy switch is off). In this way, the first digit "2" of the four digit pass number is inputted.

By the time the next T3 seconds (e.g., 20 seconds) has expired, the door is opened, the ignition switch is turned on-and-off one time, and the door is then closed. In this way, the next digit "1" of the pass number is inputted. Next, by the time T4 seconds (e.g., 20 seconds) has expired, the door is opened, on-and-off operation of the ignition switch is repeated twice, and the door is closed. By the time T5 seconds (e.g., 20 seconds) has expired, the door is opened, and after the ignition switch is turned on-and-off one time, the ignition switch is set in the on state, and the door is closed. In this way, the final two digits "2" of the pass number are inputted.

As a result, the four digit pass number "2122" is inputted, and therefore, in step 110, the immobilizer is unset and a signal permitting starting of the engine is outputted.

As described above, in the present embodiment, the pass number is inputted in which the numeral of each digit is expressed by the number of times the ignition switch is turned from off to on and the respective digits are separated by opening and closing the door (turning the courtesy switch from on to off).

In this way, the pass number is inputted by combinations of on-and-off operations of switches provided in the vehicle. When the pass number is inputted, the immobilizer is unset and a signal permitting starting of the engine is outputted. Therefore, the engine can be started even in cases in which the identification code cannot be inputted to the immobilizer control device 16 due to trouble with the transponder or the like.

In subsequent step 112, by judging whether the received identification code is the identification code of a master key, a judgment is made as to whether a master key is inserted in the key cylinder. When a master key is inserted in the key cylinder, code addition/erasure processing which will be described later is carried out in step 114.

Figure 5:
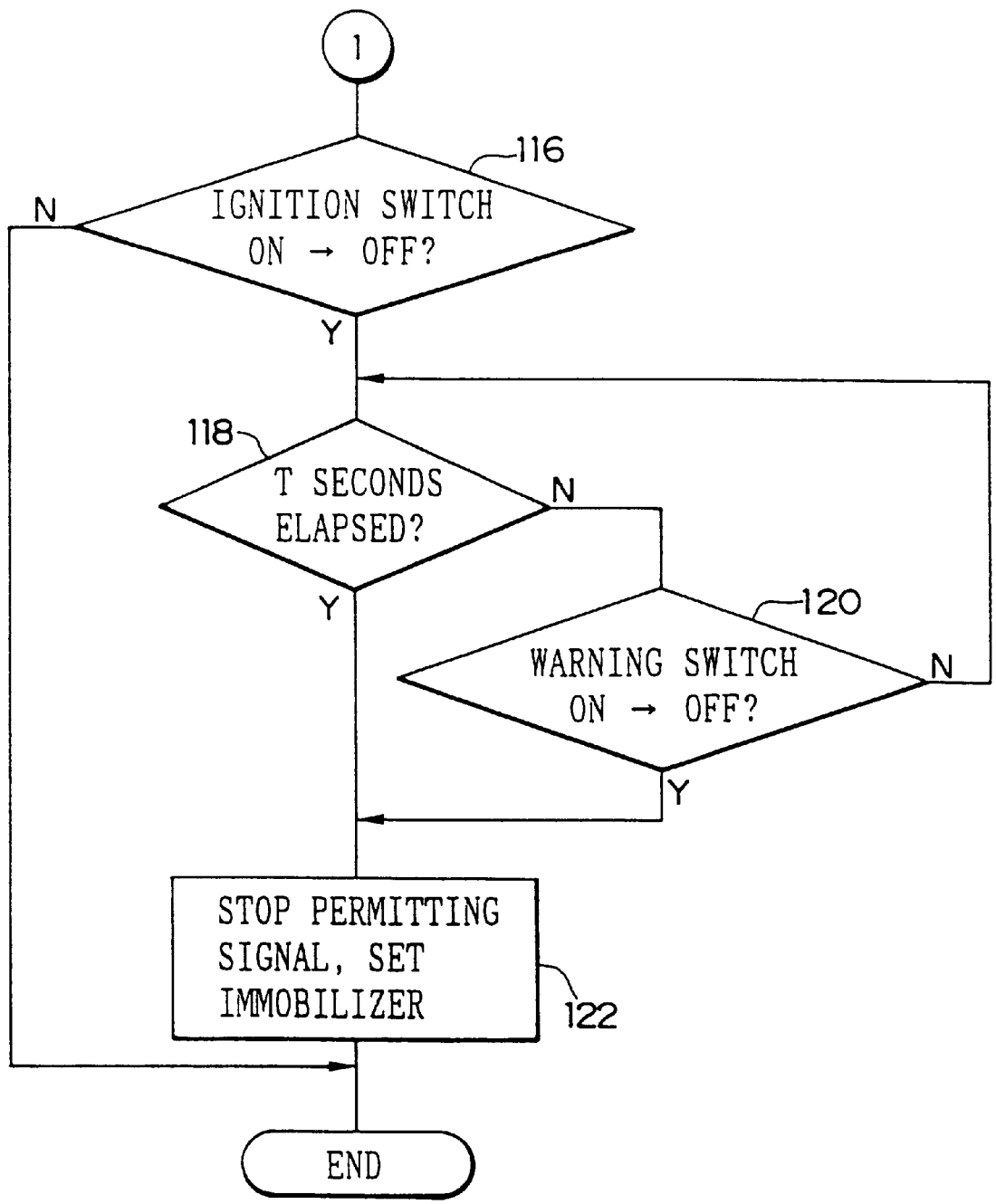
FIG. 5 is a flowchart illustrating another portion of the processing routine which continues from FIG. 4.

On the other hand, the process proceeds to step 116 (FIG. 5) without carrying out code addition/erasure processing in a case in which an auxiliary key is inserted in the key cylinder, or in a case in which a master key is inserted in the key cylinder but code addition/erasure processing is not carried out, or in a case in which code addition/erasure processing was carried out but the operations were not carried out within the predetermined times.

In step 116, a judgment is made as to whether the ignition switch has been turned from on to off, i.e., a judgment is made as to whether the operation immediately before removal of the key from the key cylinder has been carried out. In step 118, a judgment is made as to whether T seconds (e.g., 20 seconds) has elapsed. If T seconds has not elapsed, in step 120, by judging whether the warning switch 14 has been turned from on to off, it is judged whether the key has been removed from the key cylinder.

When the key has been removed from the key cylinder, in step 122, the engine start permitting signal, which has been outputted to the engine control device 22, is stopped. Starting of the engine is prohibited, and the immobilizer is set.

On the other hand, when T seconds has expired with the warning switch not having been turned from on to off and, i.e., when T seconds has elapsed without confirmation that the key has been removed from the key cylinder, in step 122, in the same way as described above, the engine start permitting signal is stopped and the immobilizer is set. In this way, even in cases in which there is trouble with the warning switch when the warning switch is either in an on state or an off state, the immobilizer can automatically be set so that the engine cannot be started.

Figure 6:
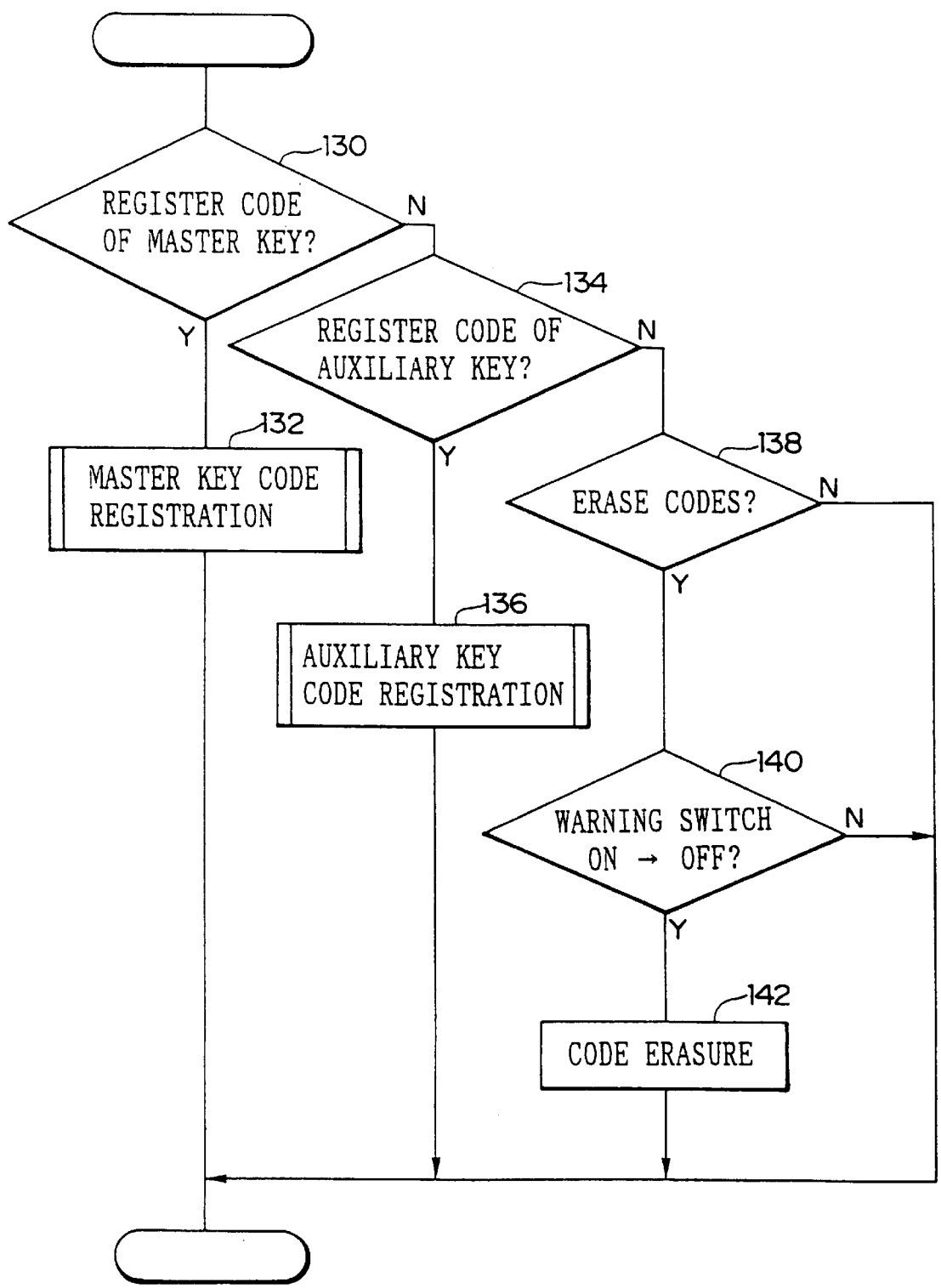
FIG. 6 is a flowchart illustrating details of step 114 of FIG. 4.

Details of step 114 will be described hereinafter with reference to FIG. 6. In step 130, a judgment is made as to whether a code of a master key is to be registered. When a code of a master key is to be registered, in step 132, the mode is changed to the registration mode, and a code is registered. The judgment as to whether a code of a master key is to be registered is effected by judging whether, after a combination operation of the on-and-off operations of the ignition switch has been repeated a first predetermined number of times, a combination operation of on-and-off operations of the courtesy switch has been repeated a second predetermined number of times. When this judgment is affirmative, it is judged that a code of a master key is to be registered, and the mode is changed to the code registration mode. The first predetermined number of times and the second predetermined number of times may be the same or different.

Figure 10:
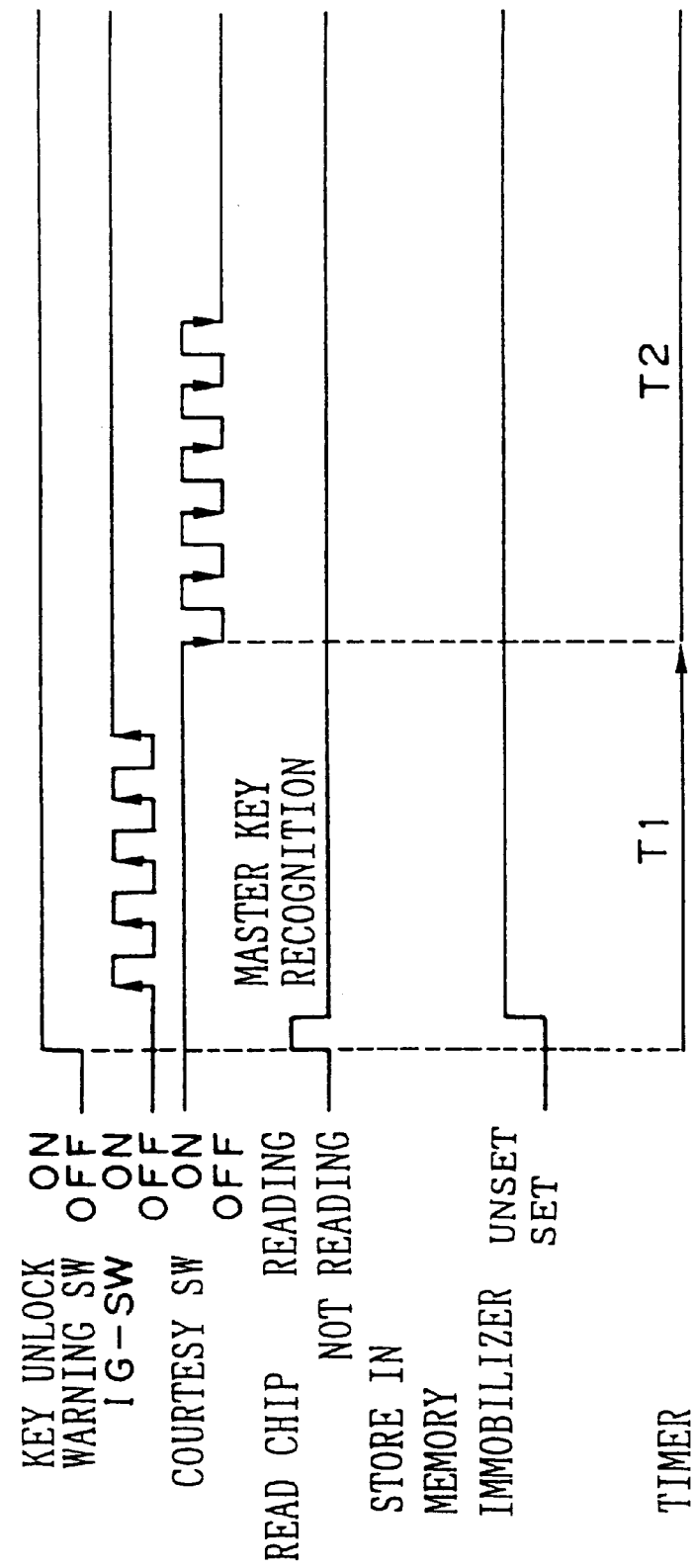
FIG. 10 is a line diagram illustrating the first half of a time chart in a case in which codes of master keys are registered.
Figure 11:
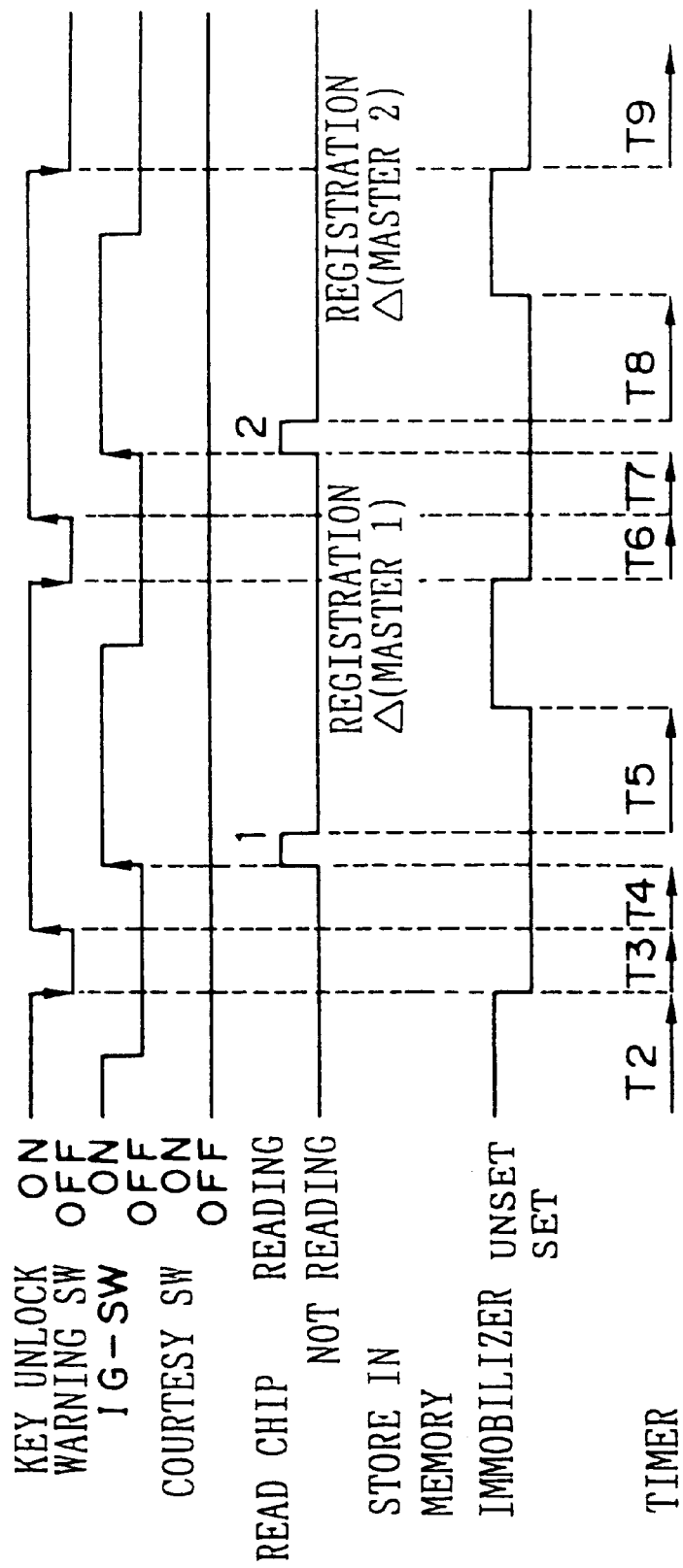
FIG. 11 is a line diagram illustrating the second half of the time chart in the case in which codes of master keys are registered.

Changing to the master key code registration mode will now be described in detail with reference to FIGS. 10 and 11. By the time T1 seconds (e.g., 15 seconds) has passed from the time the master key is inserted into the key cylinder, the operation of turning the ignition switch from off to on is repeated five times. By the time the next T2 seconds has elapsed, closing of the opened door (changing the courtesy switch from on to off) is repeated six times, the ignition switch is turned off, and the key is removed from the key cylinder. The mode is thus changed to the master key code registration mode.

When the mode is changed to the code registration mode, as will be explained later, the key identification code to be registered is registered in the memory 17 as a registered code of a master key.

In step 134, a judgment is made as to whether an auxiliary key is to be registered. When a code of an auxiliary key is to be registered, in step 136, the mode is changed to the registration mode, and the code is registered. The determination as to whether a code of an auxiliary key is to be registered is carried out by judging whether, after on-and-off operations of the ignition switch were repeated a third predetermined number of times, on-and-off operations of the courtesy switch were repeated a fourth predetermined number of times. When this judgment is affirmative, it is judged that the code of an auxiliary key is to be registered, and the mode is changed to the code registration mode. Although the third predetermined number of times and the fourth predetermined number of times may be the same or different, in order to distinguish auxiliary key code registration from master key code registration, the third predetermined number of times must be different from the first predetermined number of times or the second predetermined number of times.

Figure 12:
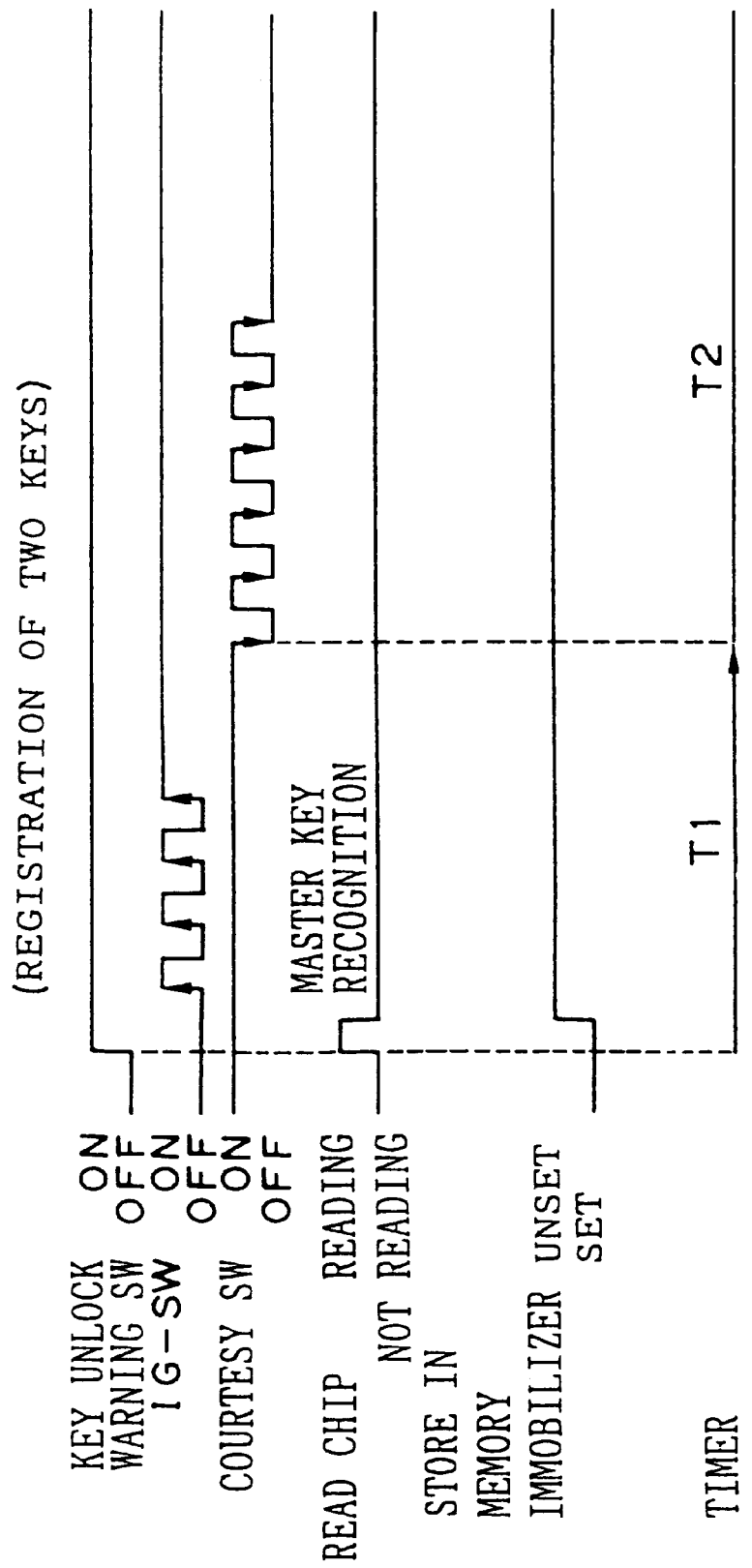
FIG. 12 is a line diagram illustrating the first half of a time chart in a case in which codes of auxiliary keys are registered.
Figure 13:
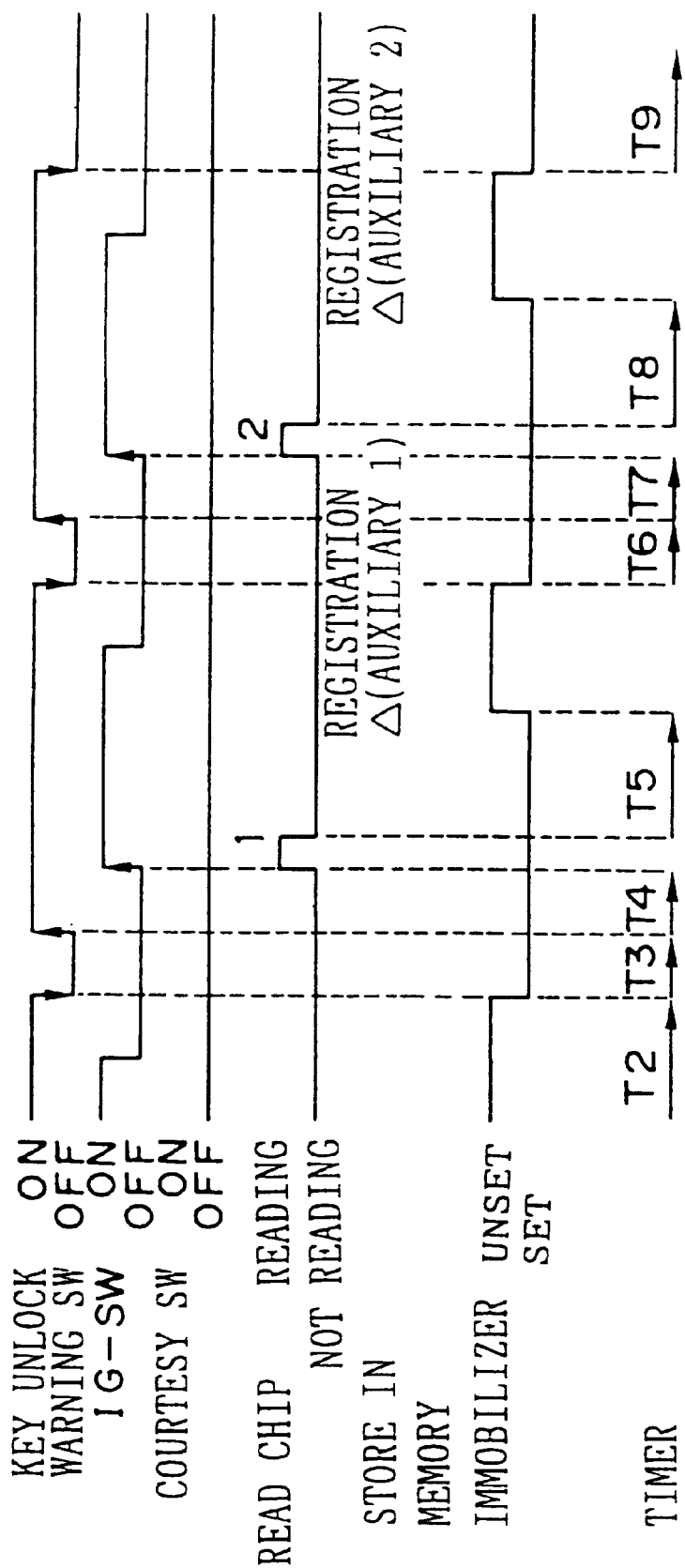
FIG. 13 is a line diagram illustrating the second half of a time chart in the case in which codes of auxiliary keys are registered.

Registration of an auxiliary key will now be described in detail with reference to FIGS. 12 and 13. The mode is changed to the auxiliary key code registration mode in the following manner. By the time T1 seconds has passed from the time the master key is inserted into the key cylinder, the operation of turning the ignition switch from off to on is repeated four times. By the time the next T2 seconds has elapsed, closing of the opened door (changing the courtesy switch from on to off) is repeated five times, the ignition switch is turned off, and the key is removed from the key cylinder. The mode is thus changed to the auxiliary key code registration mode.

When the mode is changed to the code registration mode, the key identification code to be registered is registered in the memory as a registered code of an auxiliary key.

In a case in which neither a code of a master key nor a code of an auxiliary key is to be registered, in step 138, a judgment is made as to whether registered codes are to be erased. If codes are to be erased, the mode is changed to the erasure mode. The judgment as to whether codes are to be erased is carried out by judging whether, after on-and-off operations of the ignition switch have been repeated a fifth predetermined number of times, on-and-off operations of the courtesy switch are repeated a sixth predetermined number of times. When this judgment is affirmative, it is judged that codes are to be erased. The fifth predetermined number of times and the sixth predetermined number of times are set to numbers of times which allow code erasure to be differentiated from master key and auxiliary key code registration.

Figure 14:
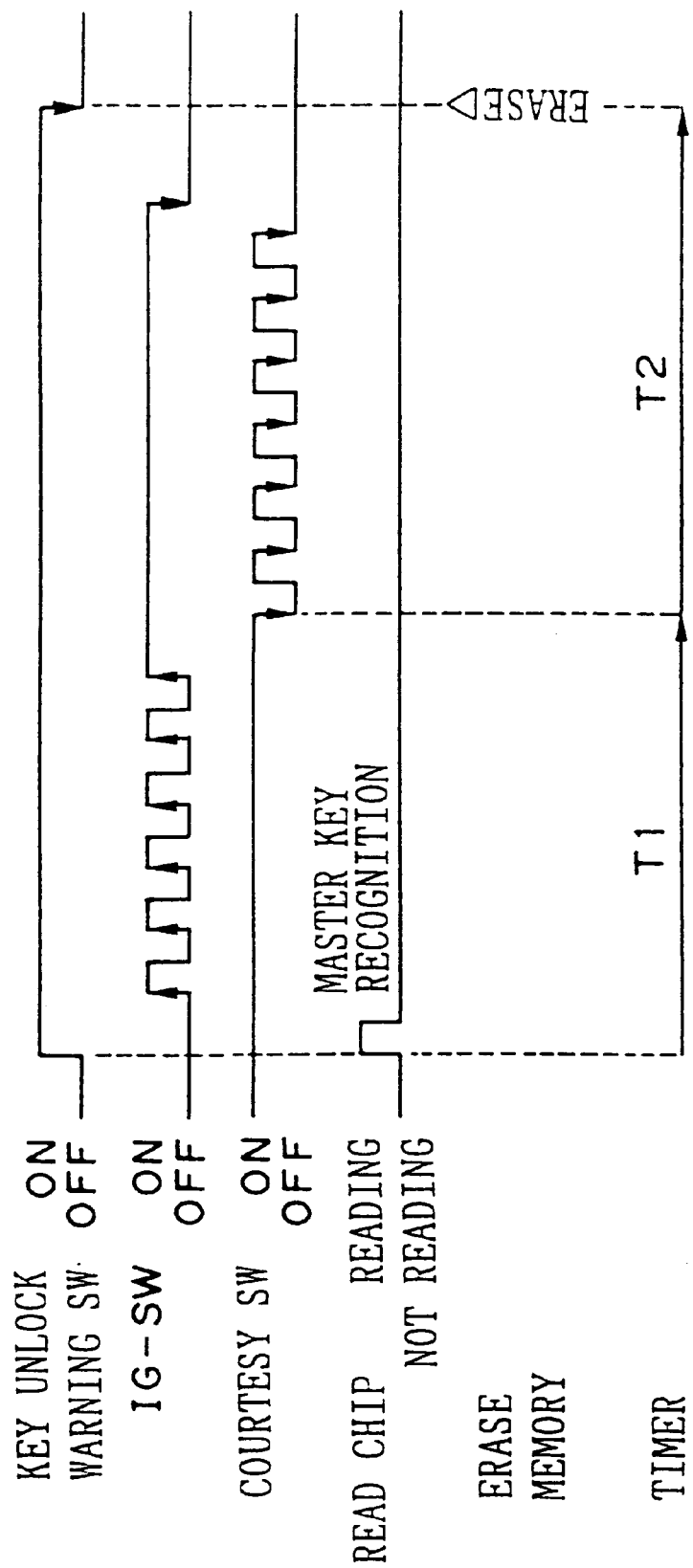
FIG. 14 is a line diagram illustrating a time chart in a case in which registered codes are erased.

Details of erasure of registered codes will now be described with reference to FIG. 14. By the time T1 seconds has passed from the time a master key is inserted into the key cylinder, the operation of turning the ignition switch from off to on is repeated six times. By the time the next T2 seconds has elapsed, the operation of closing the opened door is repeated seven times and the ignition switch is turned off. When it is judged in step 140 that the key has been removed from the key cylinder, in step 142, the registered codes stored in the memory other than the code which carried out the above-described operation are erased.

When registered codes are to be erased, all of the registered codes stored in the memory may be displayed on a display device provided at the immobilizer. The registered codes to be erased may be designated by a cursor, and the registered codes may be erased.

Figure 7:
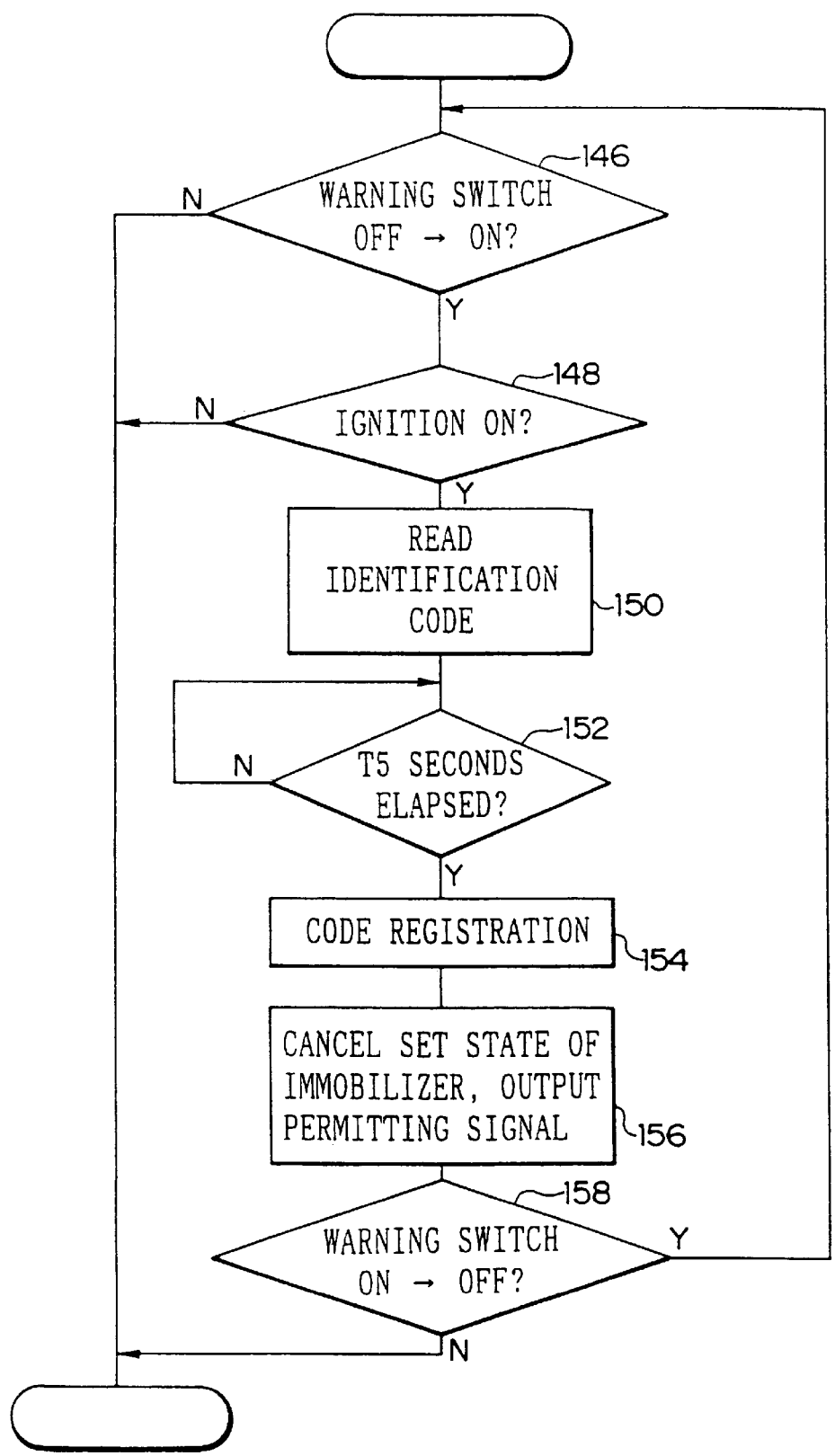
FIG. 7 is a flowchart illustrating details of step 132 of FIG. 6.

Next, details of step 132 will be described hereinafter with reference to FIG. 7 and with reference to FIGS. 10 and 11. In step 146, a determination is made as to whether the warning switch was changed from off to on within T3 seconds from the time when a master key, in which a code is registered, was removed from the key cylinder. In this way, it can be determined whether a master key whose code is to be registered is inserted. When a master key whose code is to be registered is inserted in the key cylinder, in subsequent step 148, a judgment is made as to whether the ignition switch was turned on within T4 seconds. When the ignition switch is turned on, in step 150, electromagnetic wave energy is transmitted and the identification code is transmitted from the transponder so that the identification code to be registered is read. In step 152, a judgment is made as to whether T5 seconds has passed. When T5 seconds has passed, in step 154, the received identification code is registered in the memory 17 as a registered code. Then, in step 156, the immobilizer is unset, and the engine start permitting signal is outputted.

In subsequent step 158, by judging whether the warning switch has changed from on to off, it is judged whether the master key whose identification code was registered has been removed from the key cylinder.

When the key has been removed from the key cylinder, the process returns to step 146, and a judgment is made as to whether a next master key whose code is to be registered has been inserted into the key cylinder. If a next master key has been inserted into the key cylinder, code registration is carried out in the same way as described above.

In step 136, the key which is the object of code registration is an auxiliary key. As illustrated in FIGS. 12 and 13, step 136 is the same as step 132, and therefore, description will be omitted.

The above explanation describes examples in which inputting of the pass number and changing to the code registration/erasure modes are carried out by combinations of on-and-off operations of the ignition switch and on-and-off operations of the courtesy switch. However, the present invention is not limited to the same, and inputting of the pass number and changing to the code registration/erasure modes may be carried out by combinations of on-and-off operations of any of the switches used in the vehicle such as the brake switch which is turned on and off by operation of the brake pedal, the hazard lamp switch, the switch for the turn direction indicator, or the like.

Possibility of Use in the Industry

As described above, the vehicle antitheft system and method relating to the present invention are useful in the automotive industry as a system and method by which the erasure, re-registration, and the like of registered codes can be carried out without using a tool used exclusively for such a purpose. In particular, the vehicle antitheft system and method relating to the present invention can be applied to use as a vehicle antitheft system and method with respect to the point that the various troubles involved in the owner of the vehicle re-registering codes can be eliminated.

What is claimed is:

1. A vehicle antitheft system which is set so as to prevent starting of an engine when a predetermined operation is carried out, and for which a setting is canceled so as to permit the starting of the engine when communication is carried out with a transponder provided in a key and transmitting an identification code and the identification code transmitted from the transponder matches a registered code which has been registered in advance, comprising:

first judging means for, while differentiating in advance between main keys and auxiliary keys, judging whether a specific key which is any one of the main keys or auxiliary keys is inserted in a key cylinder, the specific key being equipped with a transponder which transmits an identification code corresponding to a registered code which has been registered in advance;

second judging means for judging whether the specific key inserted in the key cylinder is a main key or an auxiliary key, by collating the registered code with the identification code;

mode changing means for, on the basis of results of judgment of said second judging means, changing a mode when a predetermined combination operation of on-and-off operations of a switching means provided in a vehicle is carried out; and code changing means for effecting at least one of registration of a code and erasure of a registered code after the mode has been changed.

2. The vehicle antitheft system according to claim 1, wherein said first judging means includes a key unlock switch which is turned on when the specific key is inserted into the key cylinder and which is turned off when the specific key is removed from the key cylinder.

3. The vehicle antitheft system according to claim 1, wherein said switching means includes at least two switches which are operated on and off.

4. The vehicle antitheft system according to claim 3, wherein said at least two switches are a courtesy switch, which is turned on when a door of the vehicle is opened and turned off when the door is closed, and an ignition switch, which is incorporated in the key cylinder and is turned on and off by the specific key.

5. The vehicle antitheft system according to claim 1, further comprising:

canceling means for canceling the setting in place of the transponder when the transponder is malfunctioning.

6. The vehicle antitheft system according to claim 5, wherein said canceling means is formed by said switching means, and the setting is canceled by a second combination operation of on-and-off operations.

7. The vehicle antitheft system according to claim 6, wherein said canceling means is a pass number.

8. The vehicle antitheft system according to claim 7, wherein the pass number is formed by a plurality of digits, and said switching means includes two switches, and numerals of the digits are set to numbers of times one switch of the two switches is on-and-off operated, and spacing between the digits is carried out by on-and-off operation of another switch of the two switches.

9. The vehicle antitheft system according to claim 1, wherein said mode changing means permits changing of the mode when said second judging means judges that the specific key is a main key.

10. The vehicle antitheft system according to claim 9, wherein said code changing means, while differentiating between main keys and auxiliary keys, registers a registered code which corresponds to an identification code of a main key or an auxiliary key which is inserted in the key cylinder and which is a main key or an auxiliary key which is different than the main key inserted in the key cylinder.

11. The vehicle antitheft system according to claim 10, wherein differentiation between main keys and auxiliary keys by said code changing means is carried out by a predetermined combination operation of on-and-off operations of said switching means.

12. The vehicle antitheft system according to claim 9, wherein said mode changing means changes the mode to a main key registration mode changing means changes the mode to a main key registration mode by a third predetermined combination operation of on-and-off operations of said switching means, and changes the mode to an auxiliary key registration mode by a fourth predetermined combination operation of on-and-off operations of said switching means, and changes the mode to a registered code erasure mode by a fifth predetermined combination operation of on-and-off operations of said switching means.

13. The vehicle antitheft system according to claim 1, wherein said mode changing means prohibits changing of the mode when said second judging means judges that the specific key is an auxiliary key.

14. The vehicle antitheft system according to claim 1, wherein the registered code corresponding to the main key and the registered code corresponding to the auxiliary key are distinguishable.

15. The vehicle antitheft system according to claim 1, wherein said mode changing means changes the mode on the basis of the predetermined combination operation of on-an-off operations and on the basis of predetermined time periods.

16. The vehicle antitheft system according to claim 1, wherein an on operation of the on-and-off operations is one state of said switching means and an off operation of the on-and-off operations is another state of said switching means.

17. The vehicle antitheft system according to claim 1, wherein said switching means is provided in said vehicle in advance.

18. A vehicle antitheft method which is set so as to prevent starting of an engine when a predetermined operation is carried out, and for which setting is canceled so as to permit the starting of the engine when communication is carried out with a transponder provided in a key and transmitting an identification code and the identification code transmitted from the transponder matches a registered code which has been registered in advance, comprising the steps of:

judging whether a specific key equipped with a transponder, which transmits an identification code corresponding to a registered code which has been registered with main keys and auxiliary keys having been differentiated in advance, is inserted in a key cylinder;

judging whether the specific key which is any one of the main keys or auxiliary keys inserted in the key cylinder is a main key or an auxiliary key, by collating the registered code with the identification code;

after the specific key has been judged to be a main key, changing a mode when a predetermined combination operation of on-and-off operations of a switching means provided in a vehicle is carried out; and after the mode has been changed and the main key has been removed from the key cylinder, carrying out at least one of erasure of a registered code and registration, differentiating between main keys and auxiliary keys, of a code corresponding to an identification code of main key or an auxiliary key which is inserted in the key cylinder and is different than said main key.

19. The vehicle antitheft method according to claim 18, further comprising the step of:

canceling the setting in place of the transponder when the transponder is malfunctioning.

20. The vehicle antitheft method according to claim 19, wherein in said canceling step, the setting is canceled by a second combination operation of on-and-off operations of said switching means.

21. The vehicle antitheft method according to claim 20, wherein said canceling means is a pass number.

22. The vehicle antitheft method according to claim 21, wherein the pass number is formed by a plurality of digits, and said switching means includes two switches, and numerals of the digits are set to numbers of times one switch of two switches is on-and-off operated, and spacing between the digits is carried out by on-and-off operation of another switch of the two switches.

23. The vehicle antitheft method according to claim 18, wherein in said code changing step, registration of a code is carried out by a second combination operation of on-and-off operations of said switching means, and erasure of a code is carried out by an third combination operation of on-and-off operations of said switching means.

24. A vehicle antitheft system which is set so as to prevent starting of an engine when a predetermined operation is carried out, and for which a setting is canceled so as to permit the starting of the engine when communication is carried out with a transponder provided in a key and transmitting an identification code and the identification code transmitted from the transponder matches a registered code which has been registered in advance, comprising:

first judging means for, while differentiating in advance between main keys and auxiliary keys, judging whether a specific key which is any one of the main keys or auxiliary keys is inserted in a key cylinder, the specific key being equipped with a transponder which transmits an identification code corresponding to a registered code which has been registered in advance;

second judging means for judging whether the specific key inserted in the key cylinder is a main key or an auxiliary key, by collating the registered code with the identification code;

mode changing means for, on the basis of results of judgment of said second judging means, changing a mode when a predetermined combination operation of on-and-off operations of a switching means provided in a vehicle is carried out; and code changing means for effecting at least one of registration of a code and erasure of a registered code after the mode has been changed, said mode includes at least one of a main key registering mode for registering the registered code of the main key and auxiliary key registering mode for registering the registered code of the auxiliary key.

25. A vehicle antitheft system which is set so as to prevent starting of an engine when a predetermined operation is carried out, and for which a setting is canceled so as to permit the starting of the engine when communication is carried out with a transponder provided in a key and transmitting an identification code and the identification code transmitted from the transponder matches a registered code which has been registered in advance, comprising:

first judging means for, while differentiating in advance between main keys and auxiliary keys, judging whether a specific key which is any one of the main keys or auxiliary keys is inserted in a key cylinder, the specific key being equipped with a transponder which transmits an identification code corresponding to a registered code which has been registered in advance;

second judging means for judging whether the specific key inserted in the key cylinder is a main key or an auxiliary key, by collating the registered code with the identification code;

mode changing means for, on the basis of results of judgment of said second judging means, changing a mode when a predetermined combination operation of on-and-off operations of a switching means provided in a vehicle is carried out; and code changing means for effecting at least one of registration of a code and erasure of a registered code after the mode has been changed, said mode includes at least one of a code registering mode for registering the registered code and a code erasing mode for erasing the registered code.

* * * * *